Figure 1:
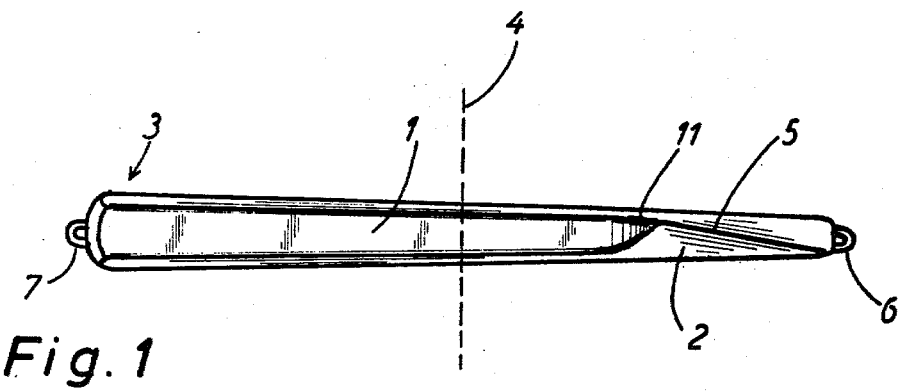

United States Patent [19]

Joergensen

[11] 4,266,361
[45] May 12, 1981

[54] FISHING-TACKLE TO BE USED AS A COMBINED JIG AND SPINNER

[75] Inventor: Ole Joergensen, 24 Upsalagade, 2100 Copenhagen, Denmark

[73] Assignee: Ole Joergensen, Copenhagen, Denmark

[21] Appl. No.: 928,376

[22] Filed: Jul. 27, 1978

[30] Foreign Application Priority Data

Aug. 3, 1977 [DK] Denmark .............................. 3463/77

[51] Int. Cl.³ .......................................... A01K 85/00
[52] U.S. Cl. ................................................. 43/42.46
[58] Field of Search ................. 43/42.45, 42.46, 42.22, 43/42.51

[56] References Cited

U.S. PATENT DOCUMENTS

| | | | |
|---|---|---|---|
| 2,762,156 | 9/1956 | Takeshita | 43/42.45 |
| 3,146,543 | 9/1964 | McVay | 43/42.45 |
| 3,611,615 | 10/1971 | Field | 43/42.36 |
| 3,676,948 | 7/1972 | Hill | 43/42.45 |

Primary Examiner—Othell M. Simpson
Assistant Examiner—Roscoe V. Parker
Attorney, Agent, or Firm—Burgess, Ryan and Wayne

[57] ABSTRACT

A fishing tackle element which serves the dual purpose of a jig and a spinner of a fishing-tackle apparatus. The element comprises a body having a tapered polygonal cross section and a spear-shaped end portion, with the spear wings having twists to impart spin to the element when it is pulled through the water. The taper of the body is selected so that the center of gravity is approximately at the longitudinal center line.

2 Claims, 4 Drawing Figures

FISHING-TACKLE TO BE USED AS A COMBINED JIG AND SPINNER

The invention relates to a fishing-tackle to be used as a combined jig and spinner comprising an elongated body which at each end is provided with means for securing a line or a hook thereto.

As a fishing-tackle the jig is used for general jigging purposes and for fishing with a fishing rod. The jig consists generally of a triangular slim body with a loose-hanging treble hook fixed to the trailing end.

By general jigging technique the jig is dropped to the bottom and is then raised a little. By raising the jig a little and then dropping it quickly again, the jig will make a "dancing" movement across the bottom and thus look like a little fish. By fishing with a fishing rod the jig is thrown out and then trolled in jerkily so that it moves as near the bottom as possible. By the known jigs, however, it is impossible to prevent these from bumping on the bottom, unless the trolling is done quickly in order to keep the jig floating a suitable distance above the bottom. This is particularly disadvantageous in cod fishing, where the jig should not move too quickly through the water, and where it has to move as near the bottom as possible.

On the contrary it is not possible to fish in the higher levels of the water with the known jigs without the trolling velocity being so high that it reduces the possibility of the fish to bite.

When trolling, a spinner and a fishing rod is used. After casting, the spinner is trolled in at variable velocity, whereby its movement in the water is changed, so that it resembles a swimming fish. The velocity of trolling is essential for the placing of the spinner in the water, as the placing is changed in accordance with the velocity of trolling. One of the commonly used spinners is the so-called Devon-Spinner which has a rotating movement in the water. It consists of a drop-shaped body which is provided with a screw at the heavy leading end and with a loose-hanging treble hook at the light trailing end. However, this spinner has often to be provided with another appendage at the trailing end near the hook in order to obtain sufficient fishing effect.

The two kinds of fishing-tackles have the common character that they are not ideal in every respect and that they can only be used as a jig or a spinner respectively.

It is the object of the invention to remedy these wants of the known fishing-tackles, and this is obtained by a fishing-tackle with a body which is at one end provided with a number of screw blades which at the leading end and at the trailing end are streamlined, and that the cross section of the body increases evenly from the end with the screw blades and till its opposite end so that the centre of gravity is approximately midway between the ends of the fishing-tackle. Hereby is first achieved that the tackle can be used either as a jig or as a spinner, as it is only a question of which of the two eyes of the tackle is chosen for securing a line or a hook respectively. Hereby it is possible to provide a tackle which to most fishermen will meet nearly any demand for jig and spinner in one single tackle. Mounted as a jig it will have a previously unknown possibility of regulation and thus a precise guiding of the height of the jig over the bottom dependant of the velocity of trolling in. This is due to the fact that the screw blades will try to raise the leading end of the jig, while the weight of the trailing end will keep it down and the resulting position will be a slightly raised leading end. This ability will make the jig "swim" across the bottom with a comparatively low velocity, and the risk of bumping on the bottom will be reduced, while a higher velocity will promote the buoyancy of the jig and thus make it ascend through the water, until the required level is achieved, where the horizontal "swimming" will continue with reduced velocity of trolling. During the conveying the jig will furthermore try a turning movement which will, however, be prevented by the weight of the trailing end, and this will result in a desired movement from side to side. Mounted as a spinner with swivel, the spinner will rotate suitably and with an unusual stability, as it will follow the pull of the line and the axis of rotation of the spinner will be at the prolongation of the line.

By making the edges of the blades streamlined and letting the body increase evenly towards the end, a suitable, quiet and easy movement through the water is obtained without the sense of hearing of the fish being disturbed.

Finally a good reflection effect is obtained, when the sides of the body are reflecting and the cross-section of the body is polygon as the radiation will have the desired effect, namely like the scales of a fish.

Figure 2:
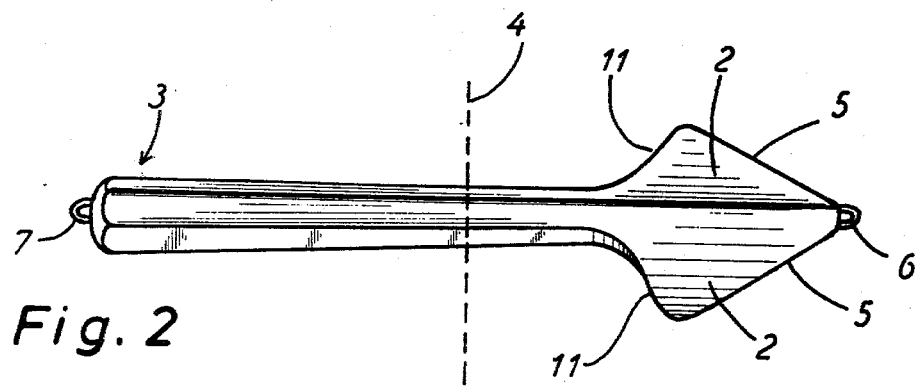
Figure 3:
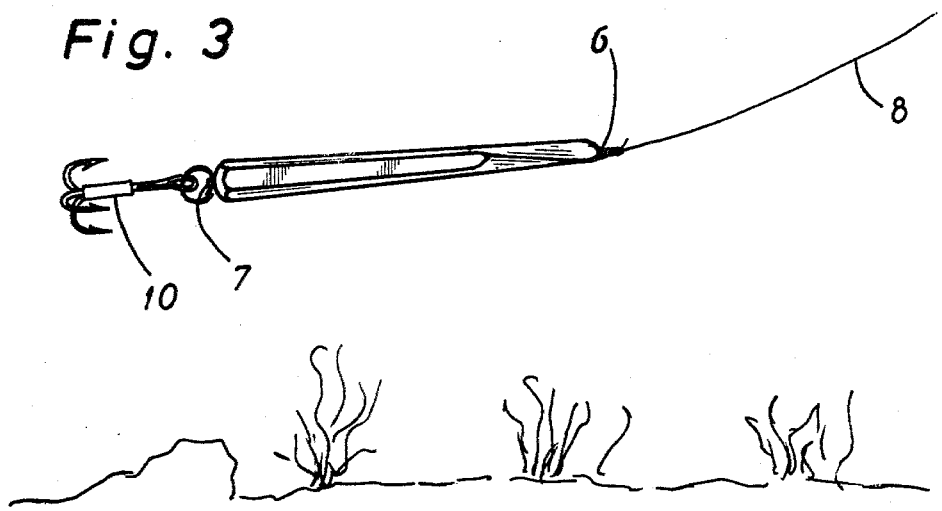
Figure 4:
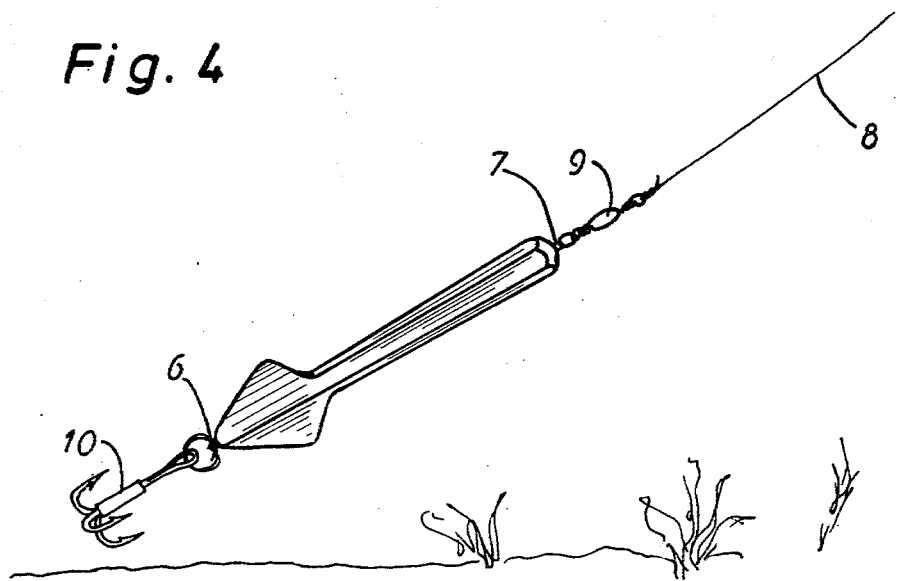

In the following the invention will be further described with regard to the drawings in which FIG. 1 shows a tackle seen from the side, FIG. 2 shows the tackle seen from above, FIG. 3 shows the tackle mounted as a jig and FIG. 4 shows the tackle mounted as a spinner.

As shown in FIGS. 1 and 2 the tackle consists of a body 1 which in the shown example has a hexagonal cross-section and with an increasing cross-sectional area towards one end. At the opposite narrow end the body has a spear-shaped end with a pair of wings 2 extending outwardly from opposite sides thereof. The wings 2 are streamlined along one edge 5 as well as along the edge 11 against the body. Simultaneously each wing 2 twists, as best seen in FIG. 1, in such a way that a blade is formed which can make the tackle rotate around its longitudinal axis.

At the opposite end of the body the weight thereof is so great that it acts as a counterweight 3 to the wings 2. The body weight and the wings are turned in such a way that the center of gravity of the tackle will be in or near its crossing center plane 4. At the ends some eyes 6,7 are provided to which the line and the hook can be secured.

The tackle can be cast or moulded in any suitable material, usually metal, and it can be made reflecting or be dyed if wished. It can be manufactured with various weights according to the type and size of the fish which are to be caught.

In FIG. 3 the tackle is shown used as a jig. As the jig does not rotate a line 8 without swivel is fastened to the eye 6 at the screw. At the opposite eye 7 a loose-hanging treble hook 10 is fastened. By pulling the line the jig moves horizontally through the water as shown, as the screw blades will provide buoyancy while the weight of the trailing end will keep the body in a slightly sloping position compared to the water. The tackle will make a twisting movement as it cannot rotate because of its unstableness and thus resembles a swimming sprat or sand launce and attract other fish. The horizontal movement through the water happens even by a low velocity of movement, so that a required slow movement can happen without the jig dropping to the bottom, like the previously known jigs.

By changing the velocity of pulling in the line as well as the length, the height over the bottom and the depth of the water level, which the jig passes during pulling in, is determined. High velocity will make the jig raise through the water, while a low velocity will make it flatten out and sink, whereby the fishing area can be exploited in quite a new and easy way.

FIG. 4 shows the other application of the tackle, namely mounted as a spinner. In this case the loose-hanging treble hook 10 is fastened to the eye 6 at the screw, while the line 8 over a swivel 9 is fastened to the opposite eye 7. During trolling the weight 3 is raised a little and enough for the screw to make the tackle rotate. A swivel prevents the line from twisting. A further advantage of this spinner is that it rotates during the trolling, while it will cease to rotate when loosening the line and then start a winding movement from side to side, which can have a further effect on the biting reflex of the fish.

I claim:

1. A fishing tackle to be used as a combined jig and spinner comprising an elongated body provided with means for securing a line or a hook, respectively, said body tapering in cross-sectional size from the rearward end to the forward end and having at said forward end a pair of wings extending outwardly from opposite sides, said wings being pitched rearwardly and upwardly from the forward end and merging into said body, thereby locating the center of gravity of said fishing tackle at approximately mid-way between the ends thereof.

2. A fishing tackle according to claim 1, wherein the cross-section of said body is polygonal.

* * * * *